(12) United States Patent
Kanda

(10) Patent No.: US 8,046,021 B2  
(45) Date of Patent: Oct. 25, 2011

(54) COMMUNICATION SYSTEM, COMMUNICATION APPARATUS, AND COMMUNICATION METHOD TO MINIMIZE INTERFERENCE BY TRANSMISSION POWER CONTROL

(75) Inventor: Tetsuo Kanda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 656 days.

(21) Appl. No.: 12/169,387

(22) Filed: Jul. 8, 2008

(65) Prior Publication Data

US 2009/0036151 A1     Feb. 5, 2009

(30) Foreign Application Priority Data

Jul. 30, 2007    (JP) .................... 2007-197848

(51) Int. Cl.
     *H04B 7/00*        (2006.01)
(52) U.S. Cl. ........ 455/522; 455/69; 455/13.4; 455/63.1; 455/114.2; 455/296; 455/502; 370/318
(58) Field of Classification Search .......... 455/522, 455/69, 13.4, 127.1–127.5, 63.1, 114.2, 296, 455/501–502; 370/318, 335; 713/320
See application file for complete search history.

(56) References Cited

U.S. PATENT DOCUMENTS

| | | | | |
|---|---|---|---|---|
| 5,898,927 | A * | 4/1999 | Ishii et al. | 455/450 |
| 7,720,502 | B2 * | 5/2010 | Suga et al. | 455/522 |
| 7,782,987 | B2 * | 8/2010 | Jonsson | 375/348 |
| 7,835,384 | B2 * | 11/2010 | Furuskar et al. | 370/445 |
| 2002/0173330 | A1 * | 11/2002 | Kojima et al. | 455/522 |
| 2006/0121928 | A1 * | 6/2006 | Itsuki | 455/522 |

FOREIGN PATENT DOCUMENTS

JP     2005-328231     11/2005  
JP     3762872 B     4/2006

\* cited by examiner

*Primary Examiner* — Shaima Q Aminzay  
(74) *Attorney, Agent, or Firm* — Cowan, Liebowitz & Latman, P.C.

(57) ABSTRACT

There is provided a communication control technique in which it is possible to avoid interference with another wireless communication system. This invention is characterized by a control station which controls wireless communication of dependent stations. When a dependent station newly starts, the control station determines whether a beacon transmitted by the dependent station is received by another wireless communication network. When determining that the beacon is received by the other wireless communication network, the control station instructs the dependent station to lower the transmission power until the beacon is not received.

9 Claims, 12 Drawing Sheets

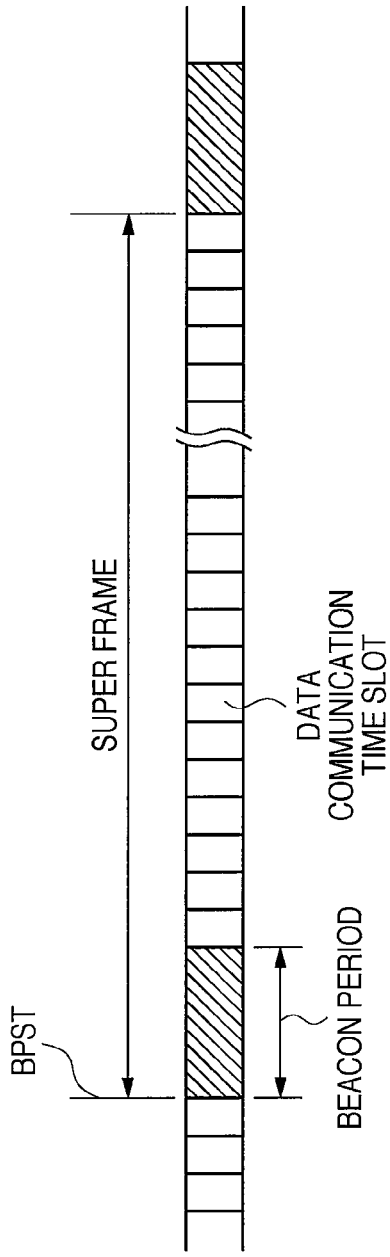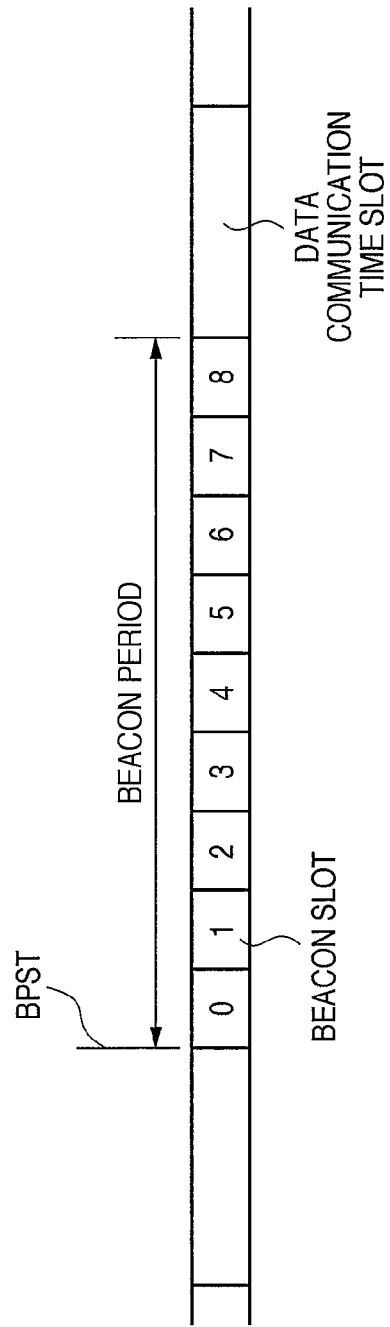

FIG. 6

| | BEACON OF Wireless USB HOST 401 | BEACON OF Wireless USB DEVICE 402 | BEACON OF Wireless USB HOST 411 | BEACON OF Wireless USB DEVICE 412 |
|---|---|---|---|---|
| BEACON SLOT NUMBER | 2 | 3 | 4 | 5 |
| ADDRESS OF SELF-TERMINAL | Address-A | Address-B | Address-C | Address-D |
| 0 | ▨ | ▨ | ▨ | ▨ |
| 1 | ▨ | ▨ | ▨ | ▨ |
| 2 | [A] | A | | |
| 3 | B | [B] | | |
| 4 | | | [C] | C |
| 5 | | | D | [D] |
| 6 | | | | |
| 7 | | | | |
| 8 | | | | |
| 9 | | | | |
| 10 | | | | |

(BEACON SLOT OCCUPANCY INFORMATION: rows 0–10)

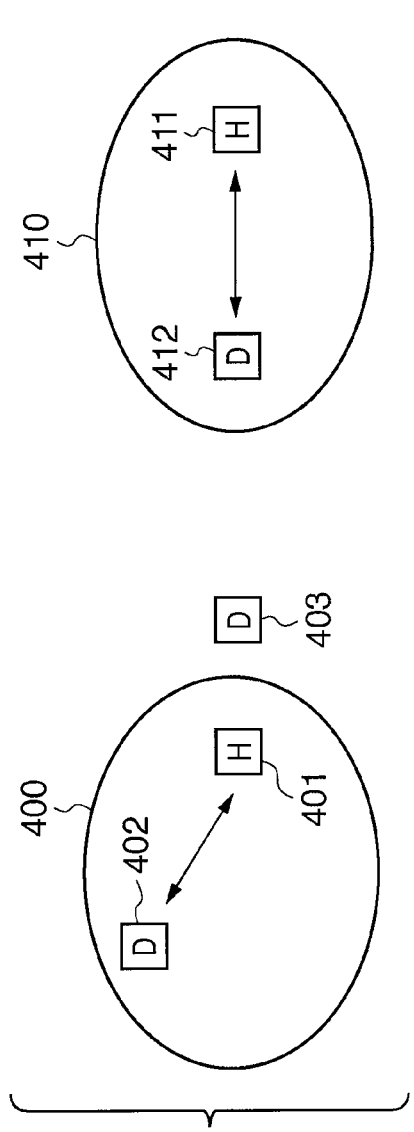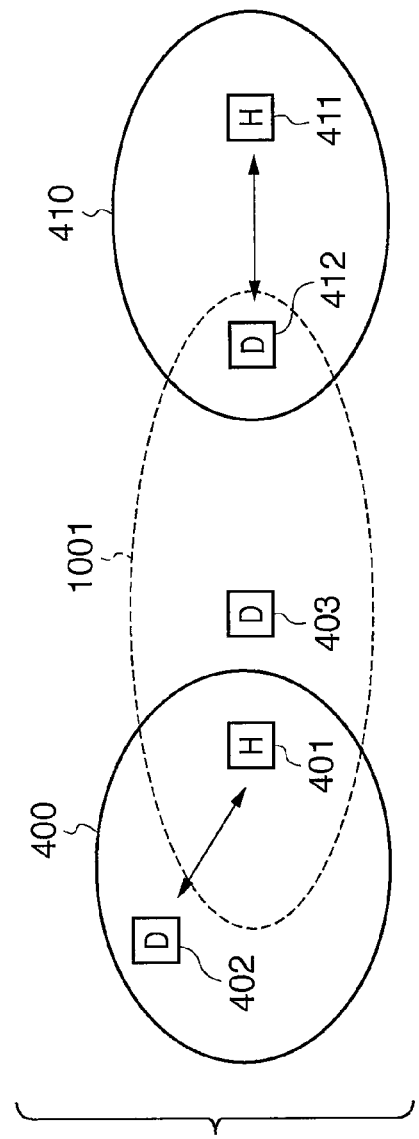

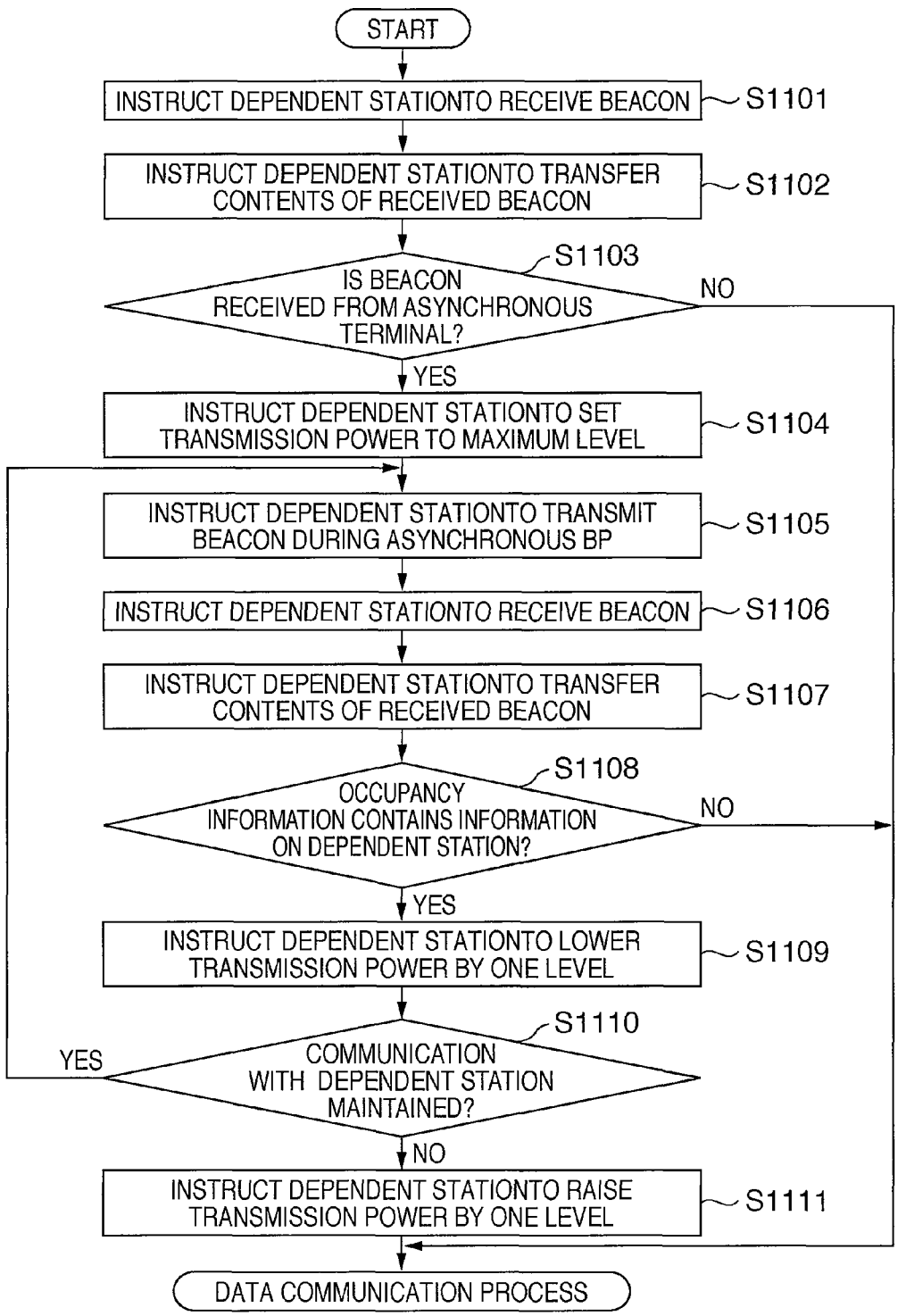

COMMUNICATION SYSTEM, COMMUNICATION APPARATUS, AND COMMUNICATION METHOD TO MINIMIZE INTERFERENCE BY TRANSMISSION POWER CONTROL

BACKGROUND OF THE INVENTION

1. Field of the Invention

The present invention relates to a communication system, a communication apparatus, and a communication method, and more particularly, to a communication control technique for suppressing interference with another communication system.

2. Description of the Related Art

A scheme of wirelessly connecting closeby apparatuses is called a WPAN, and is defined separately from a WLAN.

ECMA International as a standards organization has defined the physical layer and MAC layer specification as the ECMA-368 standard assuming a WPAN that uses a UWB (Ultra Wide Band) communication scheme. The ECMA-368 standard is also called the WiMedia standard. As a protocol operating at the upper layer of the ECMA-368 standard, the wireless USB (Universal Serial Bus) standards and the like have been defined.

In order to prevent collision of wireless frames which occurs when a plurality of wireless terminals simultaneously transmit wireless frames, the UWB communication scheme controls a timing at which each wireless terminal accesses another wireless terminal. This control scheme is defined by a Media Access Control (MAC) protocol, and is implemented by transmitting/receiving beacons.

In the UWB communication scheme, interference occurs between wireless communication systems due to frequency sharing. It is therefore important to suppress the interference for commercial use.

To suppress occurrence of interference between wireless communication systems, it is effective to decrease the transmission power of each wireless terminal in each wireless communication system.

Conventionally, various schemes of controlling transmission power for power savings have been proposed in a wireless communication system.

For example, Japanese Patent Laid-Open No. 2005-328231 has proposed the following scheme. That is, the transmission power of a wireless terminal is gradually increased, and a transmission power level upon reception of a link establishment completion signal from an access point is set in subsequent data communication.

Furthermore, Japanese Patent No. 3762872 has proposed the following scheme. That is, a control station notifies a terminal station of the lower limit expected value of reception power at which the control station can receive a signal and the terminal station sets the transmission power of itself with respect to the lower limit expected value.

However, in the above patent references, the transmission power is controlled by determining the transmission power level necessary for maintaining communication with other wireless terminals within a wireless communication system of a self-terminal. That is, the above schemes are not aimed at actively avoiding "interference" with another communication system. When the terminals communicate at the controlled transmission power, it is not always possible to avoid "interference" with another wireless communication system.

SUMMARY OF THE INVENTION

The present invention has been made in consideration of the above problems.

A communication system according to the present invention has the following configuration. That is, there is provided a communication system including a control station and a plurality of dependent stations, wherein the control station includes a reception unit configured to receive, from each dependent station, information on a signal received by the each dependent station, a determination unit configured to determine based on the information received by the reception unit whether a signal transmitted by the each dependent station interferes with another communication network, and a controlling unit configured to control transmission power of the each dependent station on the basis of the determination by the determination unit, and the each dependent station includes a transmission unit configured to transmit, to the control station, information on a signal transmitted from the other communication network.

A communication apparatus according to the present invention has the following configuration. That is, there is provided a communication apparatus comprises:

a reception unit configured to receive information on a signal received another communication apparatus;

a first determination unit configured to determine, based on the information received by the reception unit, whether a signal transmitted by the other communication apparatus interferes with another communication network; and a first instruction unit configured to instruct, based on the determination by the first determination unit, the other communication apparatus to control transmission power.

A communication method according to the present invention has the following configuration. That is, there is provided a communication method for a communication apparatus, comprises a step of determining based on information on a signal received by another communication apparatus whether a signal transmitted by the other communication apparatus interferes with another communication network; and instructing, based on the determination, the other communication apparatus to control transmission power.

According to the present invention, it is possible to decrease interference with another communication system.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a view showing the whole structure of a wireless superframe defined by a MAC protocol;

FIG. 2 is a view showing the structure of a beacon period contained in the wireless frame;

FIG. 6 is a view showing setting contents of beacons;

FIGS. 10A and 10B are views for explaining interference between wireless communication networks 400 and 410;

FIG. 11 is a flowchart showing the flow of a transmission power control process executed in the wireless USB host 401;

DESCRIPTION OF THE EMBODIMENTS

Preferred embodiments of the present invention will now be described in detail in accordance with the accompanying drawings.

A case in which the wireless USB standards are used will be described below as an example of a wireless communication network using UWB. The present invention is not limited to this, and may be implemented by other applications.

In the following explanation, assume that a control station controls communication when a wireless communication network is built in a wireless communication system, and refers to a wireless USB host in the case of the USB standards. Assume also that a dependent station communicates under the control of the control station of the wireless communication system, and refers to a wireless USB device in the case of the USB standards. Note that the control station and dependent station will be collectively referred to as wireless terminals.

First Embodiment

<1. Explanation of Wireless Superframe of MAC Protocol for UWB>

The structure of a wireless superframe defined by a MAC protocol for the UWB communication scheme will be described first.

(1) Whole Structure of Wireless Superframe

FIG. 1 is a view showing the whole structure of the wireless superframe defined by the MAC protocol. The MAC protocol controls the access timings of wireless terminals with respect to a superframe, which is repeatedly generated, with a fixed time length.

The superframe has a time length of about 65 ms and is evenly divided into 256 time slots. The use rights of data communication time slots, of those time slots, used for data communication are arbitrated by transmitting/receiving control signals called beacons between the wireless terminals.

One or more time slots at the start portion of the superframe are reserved as a region for transmitting the beacons by the wireless terminals, and are called a beacon period.

(2) Structure of Beacon Period Contained in Wireless Frame

FIG. 2 is a view showing the structure of the beacon period contained in the wireless frame. The beacon period includes a plurality of beacon slots each having a length of about 85 μs. The length of the beacon period depends on the number of wireless terminals and is variable.

The start point of the beacon period is called BPST (Beacon Period Start Time). In other words, this BPST is the start point of the superframe.

A plurality of wireless terminals which build a wireless communication network share the BPST corresponding to the start point of the superframe. A beacon to be transmitted by each wireless terminal has the following structure.

(3) Structure of Beacon

Figure 3:
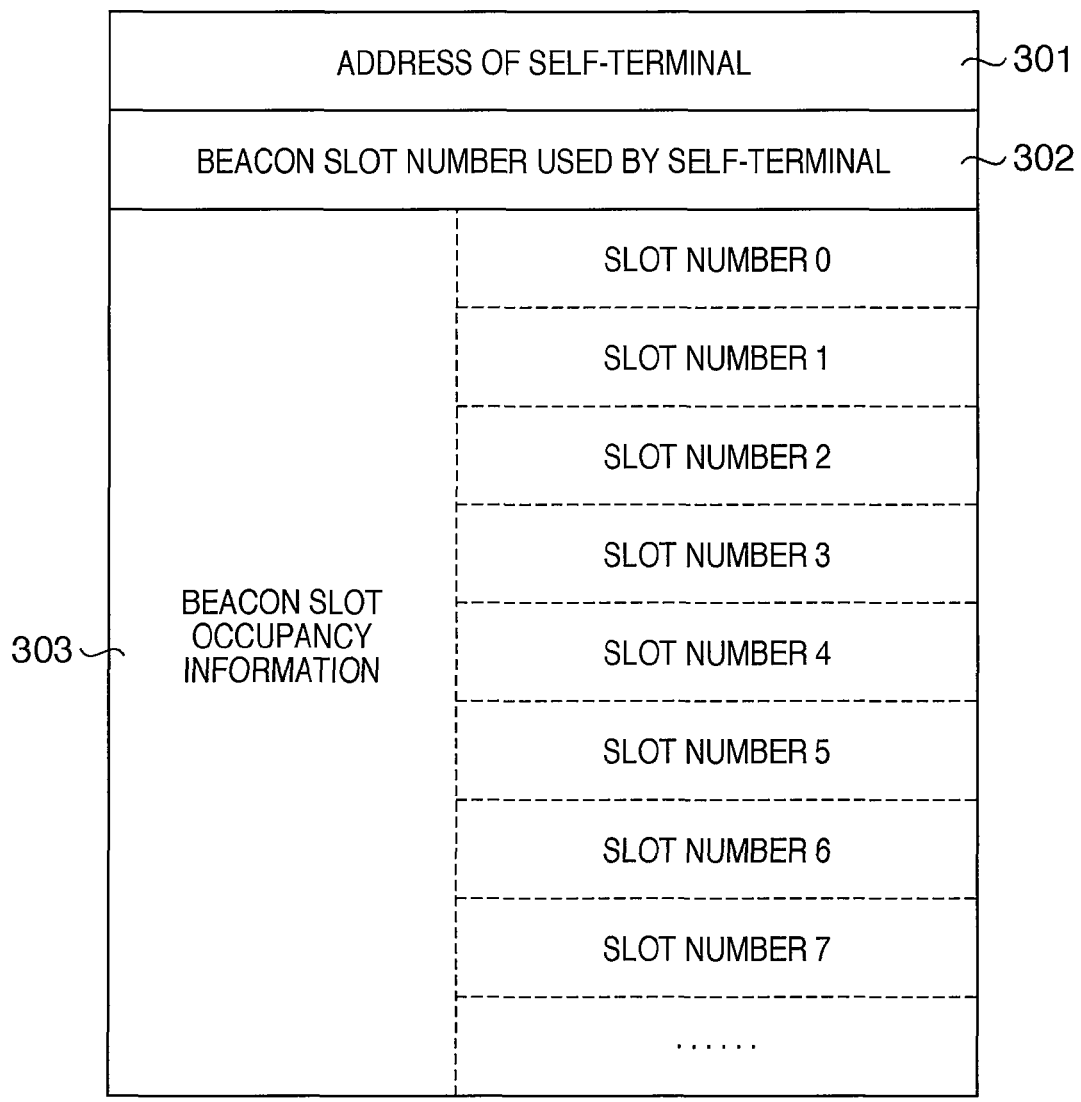
FIG. 3 is a schematic view showing the structure of a beacon transmitted according to the MAC protocol.

FIG. 3 is a schematic view showing the structure of a beacon transmitted according to the MAC protocol. As shown in FIG. 3, each wireless terminal has, within the beacon of itself, the address 301 of the self-terminal and a beacon slot number 302 which the self-terminal is using for beacon transmission.

Another wireless terminal which has received a beacon can analyze the contents of the beacon, and calculates, based on the time point when it has actually received the beacon and a beacon slot number 302 contained in the beacon, the time point of BPST recognized by a wireless terminal which has transmitted the beacon.

As described above, since a wireless terminal can determine the start point of BPST recognized by another wireless terminal, the wireless terminals can access in synchronism with each other by using the BPST as the start reference point of the super frame.

Each wireless terminal has, within the beacon of itself, beacon slot occupancy information 303 storing the addresses of other recognized wireless terminals for corresponding slot numbers. This makes it possible to avoid collision of the beacon slots.

Since the example of FIG. 3 shows, as information contained in the beacon, only elements necessary for explaining this embodiment, the format in FIG. 3 is different from a beacon frame format defined by the ECMA-368 standard and the like. However, this embodiment is not intended to exclude information other than that shown in FIG. 3.

<2. Configuration of Wireless Communication System>

Figure 4:
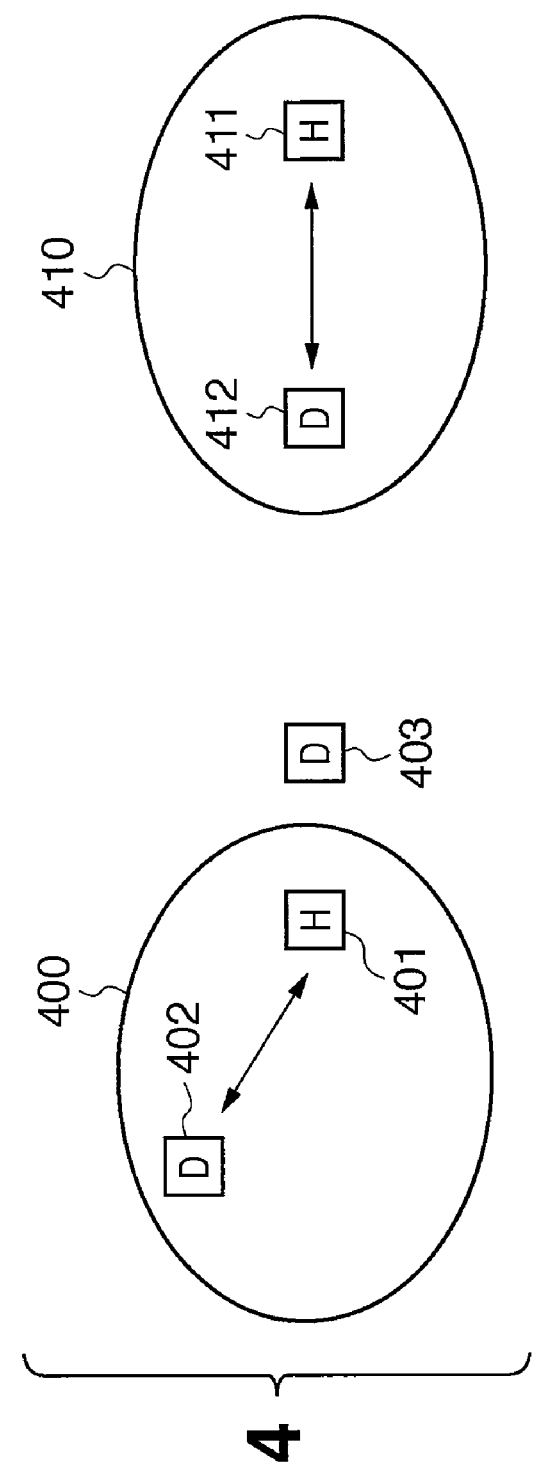
FIG. 4 is a view showing the configuration of wireless communication networks built by wireless terminals according to the first embodiment of the present invention.

FIG. 4 is a view showing the configuration of wireless communication networks built by wireless terminals according to the first embodiment of the present invention. Assume that the wireless terminals shown in FIG. 4 build wireless communication networks 400 and 410 with wireless USB using UWB.

As shown in FIG. 4, reference numeral 401 denotes a wireless USB host (control station); and 402, a wireless USB device (dependent station). The wireless USB host 401 and wireless USB device 402 build the wireless communication network 400. Similarly, reference numeral 411 denotes a wireless USB host (control station); and 412, wireless USB device (dependent station). The wireless USB host 411 and wireless USB device 412 build another wireless communication network 410 different from the wireless communication network 400.

A wireless USB device 403 which has not started is located between the wireless communication networks 400 and 410. The wireless USB device 403 is a dependent station which is connected to the wireless communication network 400 upon start of the device 403.

The wireless USB device 402 of the wireless communication network 400 is located far from the wireless USB device 412 of the wireless communication network 410. The devices 402 and 412 do not communicate or collide with each other. More specifically, each of the wireless communication networks 400 and 410 has the following configuration.

Figure 5:
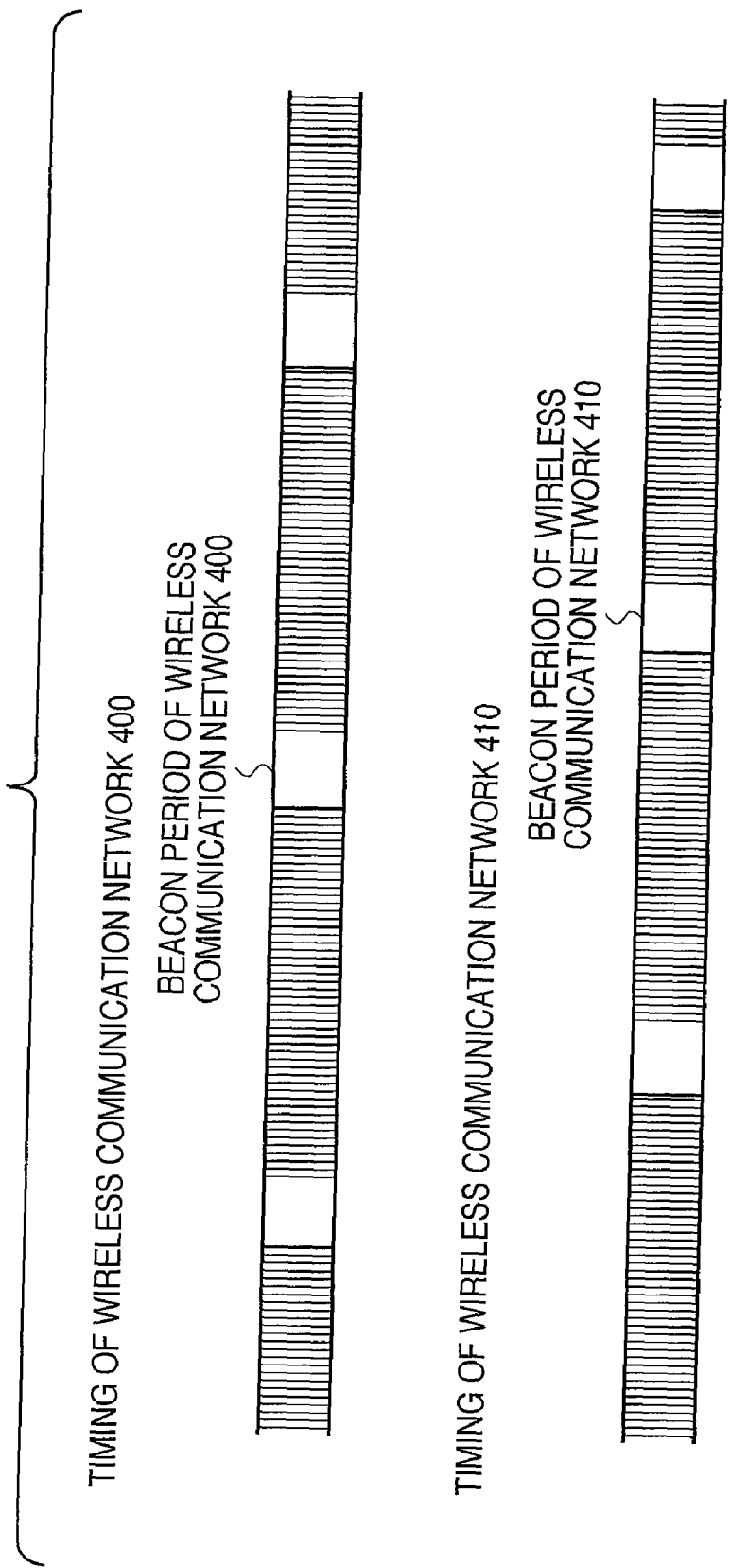
FIG. 5 is a view showing timings of the MAC protocol.

Each of the wireless communication networks 400 and 410 sets, in a super frame, BPST and a beacon period at a time point different from that of the other, as shown in FIG. 5. Such relationship between the networks is called "asynchronous". The wireless terminals having an asynchronous relationship cannot communicate data with each other.

The beacons transmitted from the wireless terminals have been set as shown in FIG. 6. The wireless USB hosts 401 and 411 are assigned the 2nd and 4th beacon slots, respectively. The wireless USB devices 402 and 412 are assigned the 3rd and 5th beacon slots, respectively.

The 0th and 1st beacon slots are not used. This is because these two beacon slots are used for optimization processing of a beacon period length in the ECMA-368 standard. However, this is not practically related to the present invention.

As shown in FIG. 6, since the wireless USB host 401 has received a beacon of the wireless USB device 402, the address of the device 402 is stored at slot number 3 as beacon slot occupancy information. Slot number 2, at which the host 401 transmits its beacon, stores the address of the host 401. Fields corresponding to the remaining slot numbers are blank.

Similarly, since the wireless USB host 411 has received a beacon from the wireless USB device 412, the address of the wireless USB device 412 is stored at slot number 5 as beacon slot occupancy information. Slot number 4, at which the host 411 transmits its beacon, stores the address of the host 411. Fields corresponding to the remaining slot numbers are blank.

It is possible to avoid collision of the wireless terminals by setting the beacons as described above.

<3. Internal configuration of Control Station>

Figure 7:
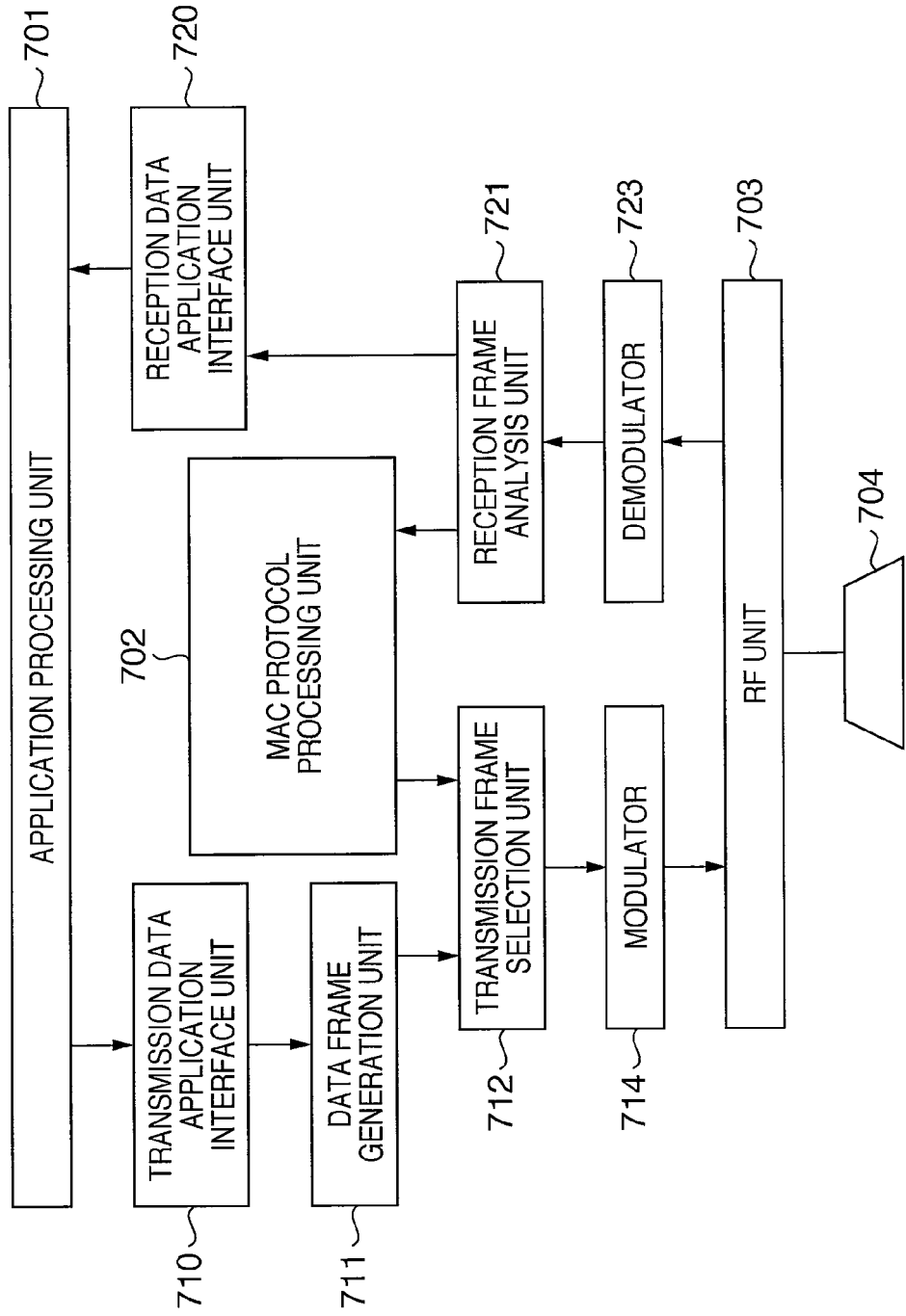
FIG. 7 is a block diagram showing an internal configuration of a control station.

FIG. 7 is a block diagram showing an internal configuration of the control station. The operations of the components of the control station are briefly described with reference to FIG. 7. Although the wireless USB host 401 will be explained as the control station, the wireless USB host 411 also has the same internal configuration.

Wireless frames transmitted by the wireless USB host 401 include a data frame for transmitting application data, a beacon frame for beacon protocol processing, and a request frame used for controlling the wireless USB device 402 (and the wireless USB device 403).

Of these frames, the data frame is transmitted/received in the following procedure. That is, an application processing unit 701 notifies, via a transmission data application interface unit 710, a data frame generation unit 711 of the application data to be transmitted. The data frame generation unit 711 converts the application data into a data frame having a format suitable for wireless communication.

After that, when a transmission frame selection unit 712 selects the data frame, a modulator 714 converts the data frame into an analog signal, and an RF unit 703 converts the analog signal into a wireless signal. An antenna 704 transmits the wireless signal to the wireless USB device 402.

The data frame which has been received at the antenna 704 and converted into a base-band signal or digital signal at RF unit 703 is demodulated by a demodulator 723 and transmitted to a reception frame analysis unit 721.

When determining that the input wireless frame is a data frame, the reception frame analysis unit 721 converts the frame into application data having a suitable format. The unit 721 passes the application data to the application processing unit 701 via a reception data application interface unit 720.

A MAC protocol processing unit 702 is used to transmit/receive the beacon frame or request frame.

The MAC protocol processing unit 702 includes a function of transmitting/receiving a beacon frame for implementing a beacon protocol. The unit 702 also includes a function of generating a request frame for controlling the wireless USB device 402 and a function of analyzing a response frame received from the wireless USB device 402 in response to the request frame. Details of each function of the MAC protocol processing unit 702 will be described below.

<4. Internal Configuration of MAC Protocol Processing Unit>

Figure 8:
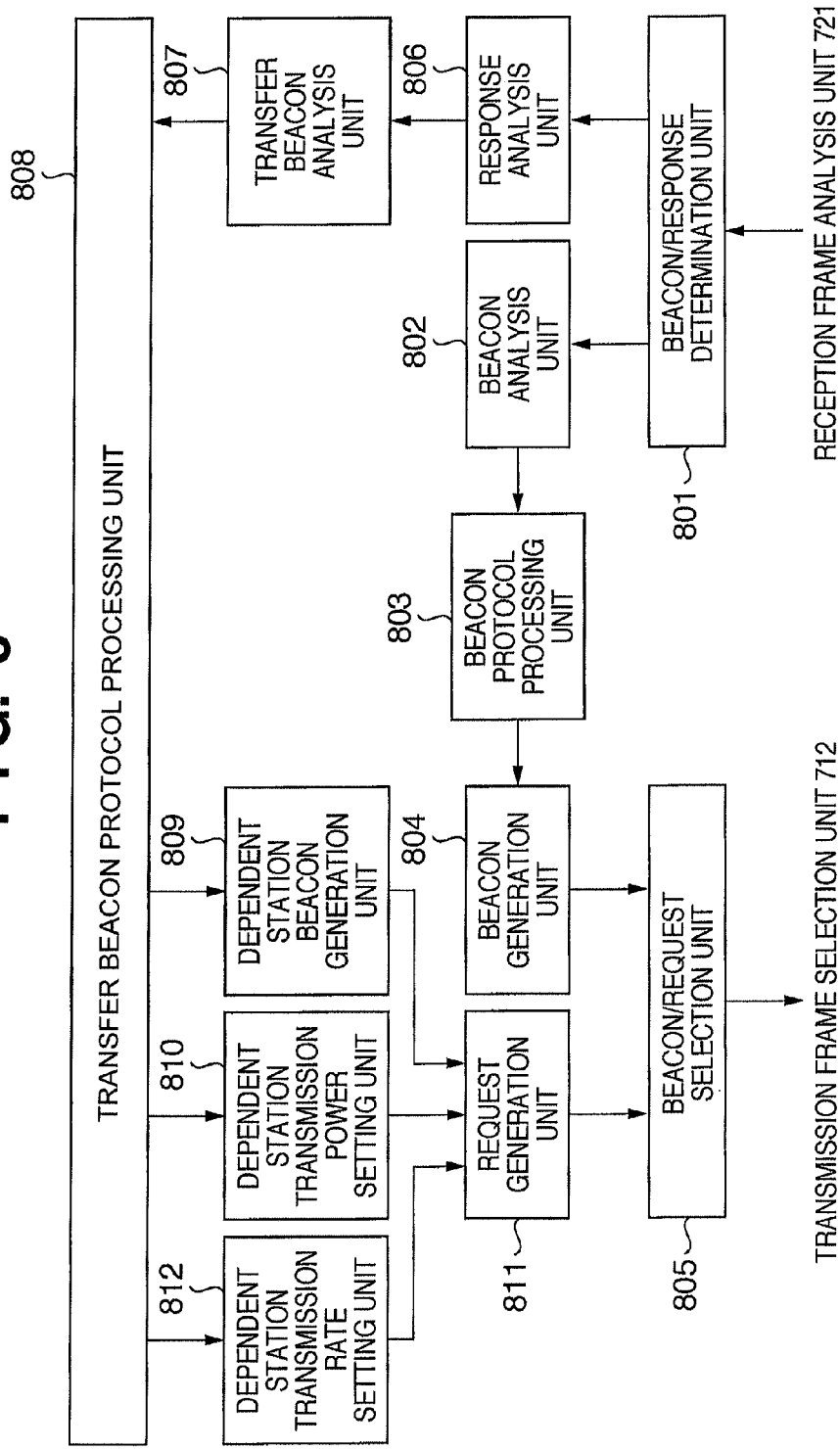
FIG. 8 is a block diagram showing an internal configuration of a MAC protocol processing unit 702 of a wireless USB host 401.

FIG. 8 is a block diagram showing an internal configuration of the MAC protocol processing unit 702 of the wireless USB host 401. The functions implemented in the MAC protocol processing unit 702 are broadly classified into the following two functions:

a function which is executed in communication with another dependent station (the wireless USB device 402) already in a connection state; and a function which is executed in communication with another dependent station (the wireless USB device 403), to be connected, currently in a standby state.

Assume that the standby state corresponds to a transition state until a newly started dependent station (the wireless USB device 403 in this embodiment) is connected to the control station (the wireless USB host 401 in this embodiment).

(1) Function in Connection State

When the wireless USB host 401 receives the beacon transmitted from the wireless USB device 402, a beacon/response determination unit 801 transmits the received beacon to a beacon analysis unit 802.

The beacon analysis unit 802 analyzes the contents of the received beacon, and notifies a beacon protocol processing unit 803 of the analysis result. In accordance with the beacon protocol, the beacon protocol processing unit 803 determines, based on the contents of the received beacon and the reception timing, parameters necessary for generating a beacon to be transmitted by the host 401.

A beacon generation unit 804 is notified of the parameters determined in the beacon protocol processing unit 803. The beacon generation unit 804 generates a beacon to be transmitted by the host 401. The generated beacon is transmitted to a beacon/request selection unit 805 and finally to the wireless USB device 402 via the antenna 704.

(2) Function in Standby state

In communication with a dependent station in the standby state, a transfer beacon protocol processing unit 808 operates. The transfer beacon protocol processing unit 808 executes a process for generating a beacon to be transmitted by the wireless USB device 403, and a process for determining a timing of transmitting the generated beacon. The unit 808 also performs transmission power control for the wireless USB device 403.

Upon execution of processing in the transfer beacon protocol processing unit 808, a dependent station beacon generation unit 809 generates a beacon to be transmitted by the dependent station (the wireless USB device 403 in this embodiment). A dependent station transmission power setting unit 810 sets transmission power necessary for the dependent station (the wireless USB device 403 in this embodiment) to transmit the beacon. A dependent station transmission rate setting unit 812 sets a transmission rate of the dependent station (the wireless USB device 403 in this embodiment).

In consideration of these processes, a request generation unit 811 generates a request frame used for sending, to the wireless USB device 403, instructions for beacon transmission, beacon interception, beacon transfer, and transmission power control.

A response analysis unit 806 analyzes a response frame received by the wireless USB host 401 from the wireless USB device 403 in response to the request frame.

A transfer beacon analysis unit 807 analyzes the beacon received by the wireless USB host 401 from the wireless USB device 403.

<5. State Transition in Control Station>

Figure 9:
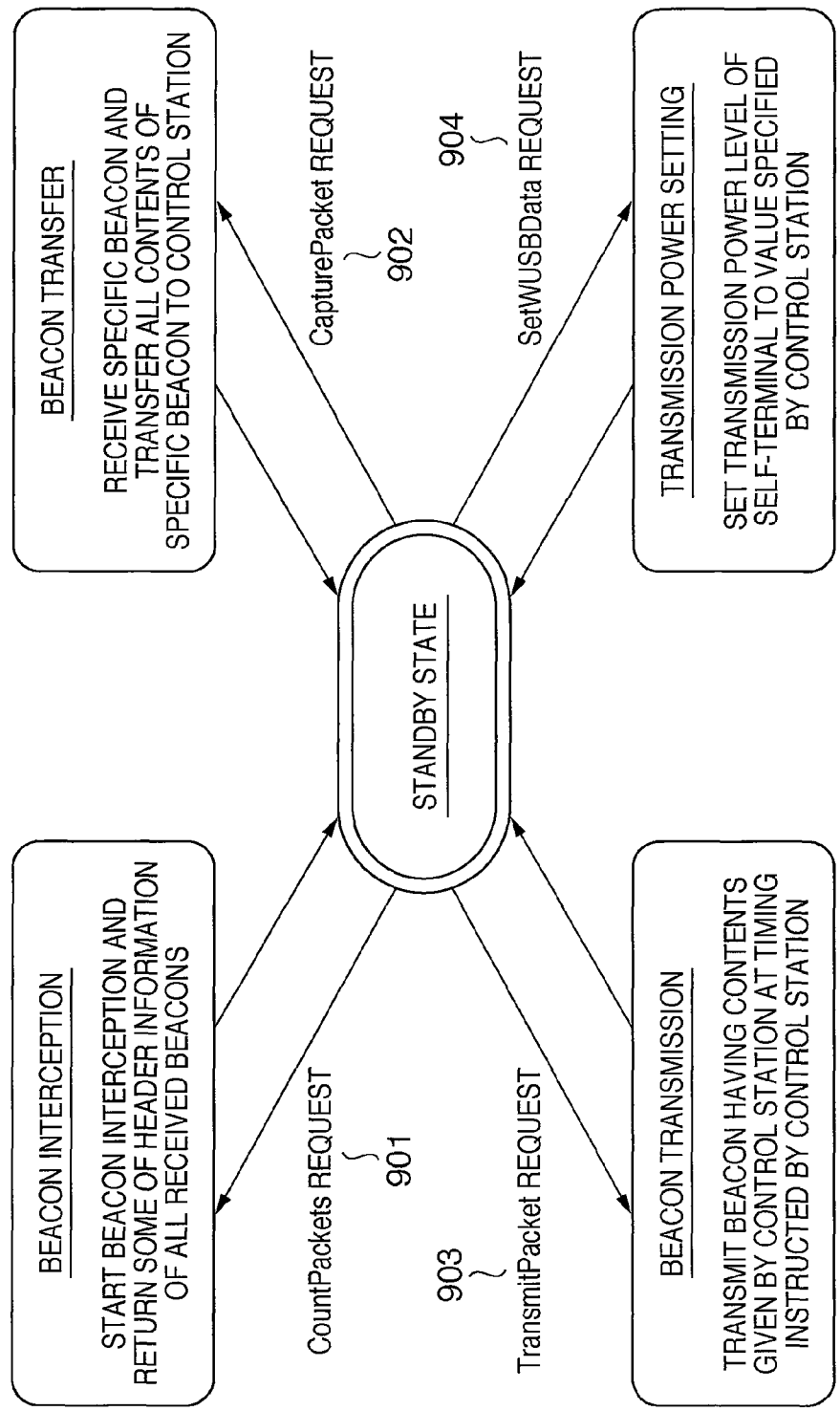
FIG. 9 is a state transition chart showing the state transition of the wireless USB host 401 when a wireless USB device 403 is in a standby state.

FIG. 9 is a state transition chart showing the state transition of the wireless USB host 401 when the wireless USB device 403 is in the standby state. In other words, FIG. 9 shows a control process when the wireless USB host 401 controls the newly started wireless USB device 403.

The wireless USB device 403 is controlled by transmitting a request from the wireless USB host 401 to the wireless USB device 403. The wireless USB device 403 which has executed a process in accordance with the request notifies the wireless USB host 401 of the result of the process by transmitting a response in response to the request. As shown in FIG. 9, the wireless USB host 401 controls the wireless USB device 403 in the standby state using four kinds of requests.

Reference numeral 901 denotes a CountPackets request. The wireless USB device 403 which has received the CountPackets request from the wireless USB host 401 starts beacon interception.

The device 403 returns, as a response to the wireless USB host 401, the number of beacons which have been received during a specified period of time, the first six bytes of the MAC header of each of the received beacons, the reception timings, and the reception qualities.

Reference numeral 902 denotes a CapturePacket request. The wireless USB device 403 which has received the CapturePacket request from the wireless USB host 401 receives a beacon specified by the request. The device 403 returns, as a response to the wireless USB host 401, all the contents of the received beacon, the reception timing, and the reception quality.

That is, by using the CountPackets and CapturePacket requests, the wireless USB host 401 can know information pertaining to the beacons received by the wireless USB device 403.

Reference numeral 903 denotes a TransmitPacket request. The wireless USB device 403 which has received the TransmitPacket request from the wireless USB host 401 transmits a beacon having contents specified by the request at a specified timing. By using the TransmitPacket request, the wireless USB host 401 can cause the wireless USB device 403 to execute beacon transmission.

Reference numeral 904 denotes a SetWUSBData request. The wireless USB device 403 receives the SetWUSBData request in which a parameter wValue is set to TransmitPower from wireless USB host 401. The device 403 sets, to a value specified by the request, the transmission power which is to be used when the device 403 transmits a beacon.

That is, by using the SetWUSBData request, the wireless USB host 401 can control the transmission power of the wireless USB device 403.

As described above, the wireless USB device 403 executes the beacon transmission under the control of the wireless USB host 401. This makes it possible to cause the wireless USB device 403 to cooperate with the wireless USB device 412 which is hidden to the wireless USB host 401 in accordance with the beacon protocol.

<6. Explanation of Interference Between Wireless Communication Systems>

FIGS. 10A and 10B are views for explaining interference between the wireless communication networks 400 and 410. As described above with reference to FIG. 4, the wireless USB device 402 of the wireless communication network 400 is located far from the wireless USB device 412 of the wireless communication network 410. The devices 402 and 412 do not communicate or collide with each other, and in this case, do not interfere with each other (FIG. 10A).

However, when the wireless USB device 403 starts in this state, interference occurs between the wireless communication networks 400 and 410. Details of this situation will be described below.

The started wireless USB device 403 intercepts wireless frames first, and detects the presence/absence of a control station (the wireless USB host 401) around itself, to which the device 403 is to connect.

Assume that the device 403 has received a wireless frame transmitted by the wireless USB host 401. The wireless USB device 403 determines that the wireless USB host 401 is a control station to which the device 403 is to be connected.

As a result of the determination, the wireless USB device 403 connects to the wireless USB host 401.

Upon completion of the connection, the wireless USB host 401 transmits CountPackets and CapturePacket requests to the wireless USB device 403. With this operation, the wireless USB host 401 detects another wireless USB device existing around the wireless USB device 403.

The wireless USB host 401 sends a TransmitPacket request to instruct the wireless USB device 403 to transmit the beacon during the beacon period of the wireless communication network 400.

As shown in FIG. 10B, a transmittable range 1001 of a wireless frame transmitted by the wireless USB device 403 includes the wireless USB device 412. The wireless frames such as the beacon transmitted by the wireless USB device 403 therefore interfere with the wireless USB device 412.

More specifically, the wireless USB device 403 transmits other wireless frames used for data communication as well as the beacon at a MAC protocol timing synchronous with the wireless communication network 400. Therefore, all these wireless frames may interfere with the wireless communication network 410 to which the wireless USB device 412 belongs.

The wireless USB host 401 in this embodiment controls the transmission power of the started wireless USB device 403 to avoid interference with the wireless communication network 410. Details of the flow of a transmission power control process in the wireless USB host 401 will be described below.

<8. Flow of Transmission Power Control Process for Avoiding Interference in Control Station>

FIG. 11 is a flowchart showing the flow of a transmission power control process which is executed in the wireless USB host 401 so that interference with the wireless communication network 410 does not occur when the wireless USB device 403 newly starts.

Upon being started, the newly started wireless USB device 403 intercepts wireless frames during a predetermined period of time, in order to search for a partner to which the device 403 is to connect first. At this time, the wireless USB device 403 which has received a wireless frame transmitted by the wireless USB host 401 determines that the wireless USB host 401 is a desired communication partner terminal of itself. As a result, the device 403 sends a connection request to the wireless USB host 401.

Upon reception of the connection request from the wireless USB device 403, the wireless USB host 401 starts the transmission power control process shown in FIG. 11.

In step S1101, after allowing the wireless USB device 403 to connect, the host 401 issues a beacon interception request to the wireless USB device 403.

Although this beacon interception request corresponds to the CountPackets request in the wireless USB protocol, the present invention is not particularly limited to this as long as the beacon interception of the wireless USB device 403 is started.

In step S1102, after a period of time specified by the beacon interception request elapses, the host 401 issues a beacon transfer request to the wireless USB device 403.

Although the beacon transfer request corresponds to the CapturePacket request in the wireless USB protocol, the present invention is not particularly limited to this. Other schemes are available as long as the wireless USB device 403 is instructed to transfer the contents of the received beacons to the wireless USB host 401.

As a response to the beacon transfer request, the wireless USB device 403 transfers, to the wireless USB host 401, information on the beacons received by the device 403 itself (the first transmission unit). The wireless USB host 401 receives the information (the first reception unit). The information on the beacons contains the contents of the beacons and the timings when the beacons are received.

In step S1103, the host 401 analyzes the information on the beacon which has been received from the wireless USB device 403. The host 401 determines whether the wireless USB device 403 has received beacons from wireless terminals belonging to an asynchronous network (the wireless communication network 410 in this embodiment) (the first determination unit).

If the host 401 determines in step S1103 that the wireless USB device 403 has received beacons from wireless terminals belonging to the wireless communication network 410, the process advances to step S1104.

In step S1104, the host 401 sends a transmission power setting request for setting the transmission power to the maximum level to the wireless USB device 403.

Although the transmission power setting request corresponds to the SetWUSBData request in the wireless USB protocol, the present invention is not particularly limited to this. Other schemes are available as long as the transmission power of the wireless USB device 403 is set.

In step S1105, the host 401 sends, to the wireless USB device 403, a beacon transmission request to start beacon transmission during an asynchronous BP (the first instruction unit). One of the characteristic features of this embodiment is that a beacon slot of an asynchronous BP used by the wireless communication network 410 is selected as a timing of beacon transmission.

Although the beacon transmission request corresponds to the TransmitPacket request in the wireless USB protocol, the present invention is not limited to this as long as beacon frame transmission of the wireless USB device 403 is started.

If the wireless USB device 403 transmits the beacon at the maximum transmission power (the second transmission unit), the transmittable range 1001 of the beacon includes the wireless USB device 412 as well as the wireless USB host 401.

Therefore, the wireless USB device 412 receives the beacon transmitted from the wireless USB device 403. The wireless USB device 412 which has received the beacon stores the address of the wireless USB device 403 in a field of the beacon slot occupancy information contained in the beacon to be transmitted by the device 412. The address is stored in a field, of the fields of the beacon slot occupancy information, which corresponds to the slot number at which the device 412 has received the beacon from the wireless USB device 403. The wireless USB device 412 transmits the thus generated beacon to the wireless USB device 403.

In step S1106, the host 401 retransmits the beacon interception request and beacon transfer request to the wireless USB device 403 again. In response to the beacon interception request, the wireless USB device 403 receives the beacon transmitted from the wireless USB device 412. In response to the beacon transfer request, the device 403 transfers information on the received beacon to the wireless USB host 401 (the third transmission unit).

In step S1107, the host 401 receives the information on the beacon transferred from the wireless USB device 403 (the second reception unit).

In step S1108, the host 401 analyzes the contents of the received beacon. The host 401 determines whether the beacon slot occupancy information contained in the beacon transmitted by the wireless USB device 412 contains information pertaining to the wireless USB device 403 (the second determination unit).

If the beacon slot occupancy information generated by the wireless USB device 412 contains information pertaining to the wireless USB device 403, this means that the wireless USB device 412 has received the beacon from the wireless USB device 403. That is, the beacon transmitted by the wireless USB device 403 is interfering with the wireless communication network 410. Therefore, if the beacon slot occupancy information generated by the wireless USB device 412 contains information pertaining to the wireless USB device 403, it is determined that interference has occurred and the process advances to step S1109.

In step S1109, the wireless USB host 401 determines that the beacon of the wireless USB device 403 has reached the wireless USB device 412. The host 401 issues, to the wireless USB device 403, a transmission power setting request to change the transmission power (lower the transmission power by one level) (the second instruction unit).

In accordance with the transmission power setting request, the wireless USB device 403 lowers the transmission power of the beacon.

In step S1110, the wireless USB host 401 determines whether the communication with the wireless USB device 403 is maintained.

If the host 401 determines in step S1110 that the communication with the wireless USB device 403 is maintained, the process returns to step S1105. The host 401 issues a beacon interception request to the wireless USB device 403 again. By repeating the processes in steps S1105 to S1110, the transmission power of the wireless USB device 403 is gradually changed (decreased).

In the following two cases, the wireless USB host 401 completes the transmission power control in the wireless USB device 403.

In the first case, the beacon slot occupancy information transmitted by the wireless USB device 412 does not contain the information for identifying the wireless USB device 403 in step S1108.

In this case, the wireless USB host 401 ends the transmission power control process, and transits to a data communication process.

Figure 12:
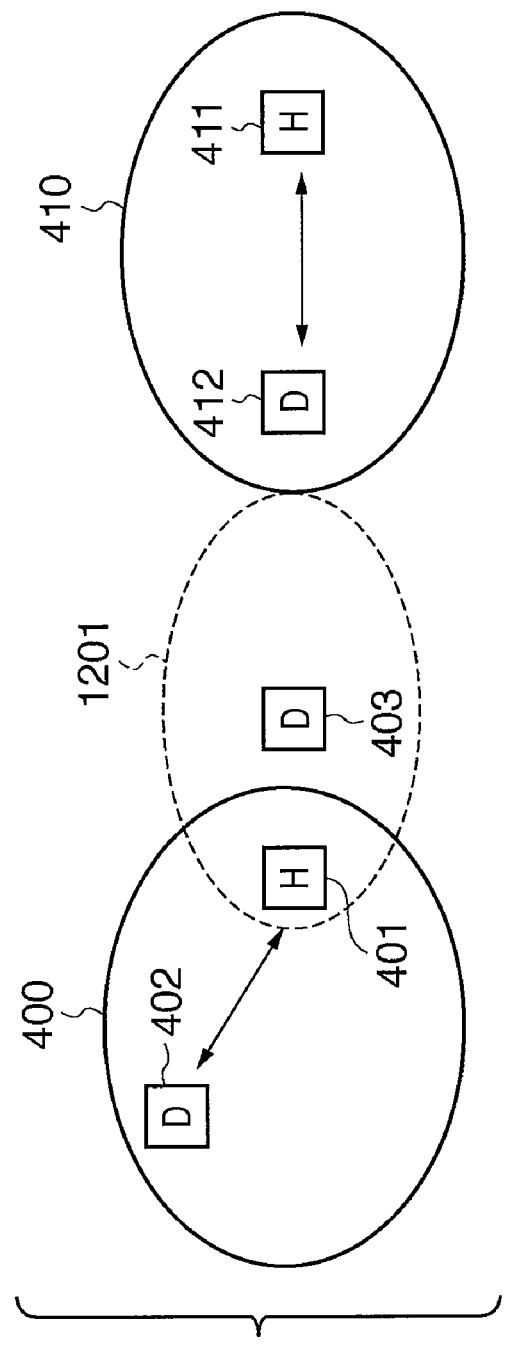
FIG. 12 is a view showing the transmittable range of the beacon of the USB device 403 after the transmission power control process is executed.

At this time, a transmittable range 1201 of the wireless frame transmitted by the wireless USB device 403 does not include the wireless USB device 412 (see FIG. 12). This means that the wireless frame transmitted by the wireless USB device 403 does not interfere with the wireless USB device 412.

In the second case, the wireless USB host 401 cannot receive the wireless frame transmitted by the wireless USB device 403 in step S1110.

In this case, the wireless USB host 401 sends the transmission power setting request to instruct the wireless USB device 403 to raise (increase) the transmission power by one level (step S1111), and transitions to a data communication process.

Interference which occurs with the wireless USB device 412 due to the wireless frame transmitted by the wireless USB device 403 is not completely avoided. However, it is possible to decrease interference with the wireless USB device 412 as much as possible by using, as a lower limit value, the transmission power necessary for maintaining the communication with the wireless USB host 401.

As is apparent from the above explanation, according to this embodiment, it is possible to decrease interference which occurs, due to a wireless frame transmitted by a dependent station, with a wireless terminal of another wireless communication network that operates asynchronously.

In a wireless communication system which switches and uses a plurality of data transmission rates in accordance with a communication state, it is possible to transmit data at a communicable transmission rate depending on transmission power determined in accordance with the flowchart of FIG. 11.

Second Embodiment

In the above first embodiment, transmission power control is performed by gradually decreasing the transmission power of the wireless USB device 403. However, the present invention is not limited to this, and the transmission power control may be performed by gradually increasing the transmission power.

Figure 13:
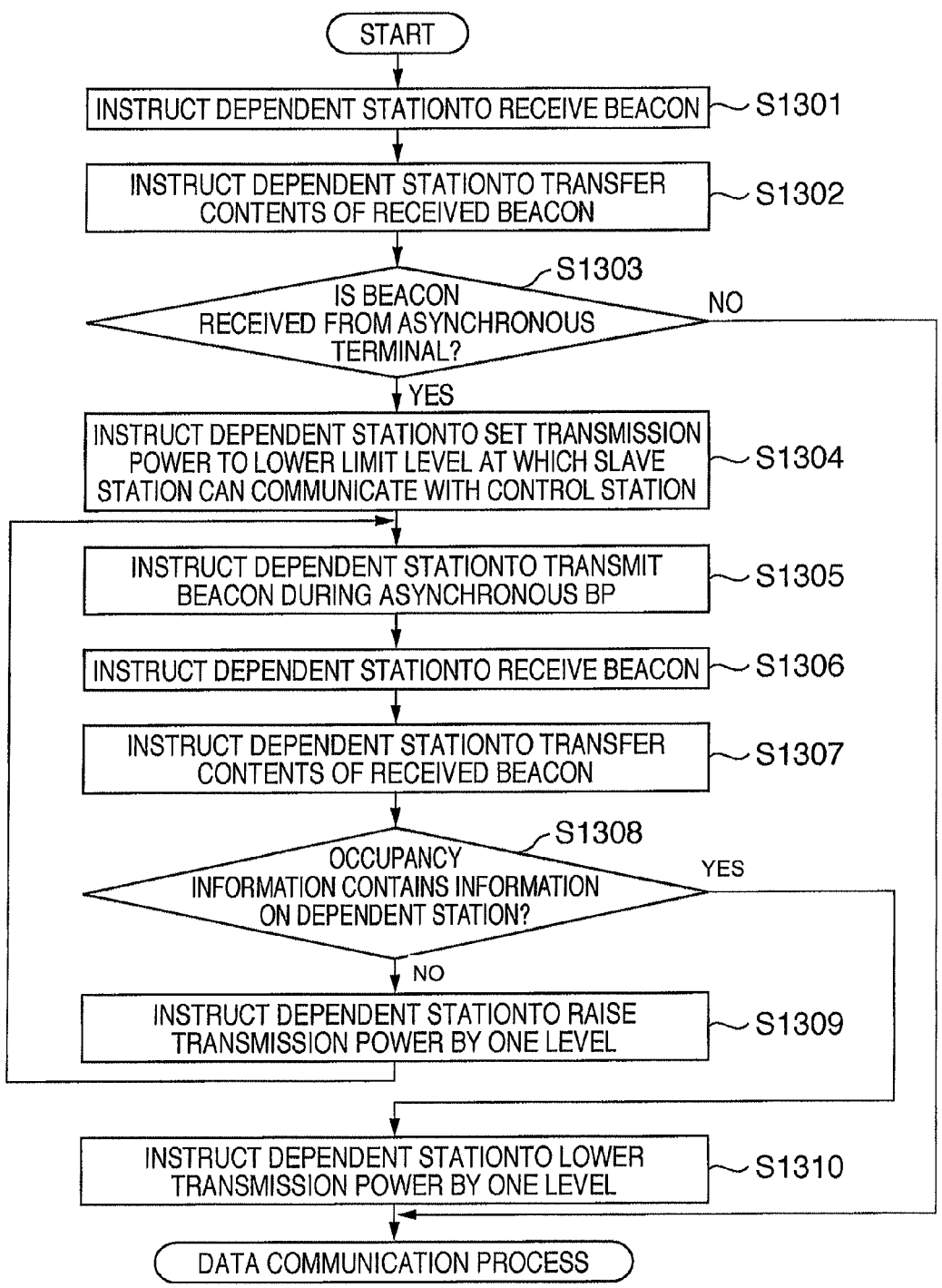
FIG. 13 is a flowchart showing the flow of another transmission power control process executed in a wireless USB host 401.

Referring to FIG. 13, the flow of a transmission power control process for avoiding interference in a control station according to this embodiment will be described below.

Upon being started, a newly started wireless USB device 403 intercepts wireless frames during a predetermined period of time in order to search for a partner to which the device 403 is to connect first. At this time, the wireless USB device 403 which has received a wireless frame transmitted by a wireless USB host 401 determines that the wireless USB host 401 is a desired communication partner terminal of itself. As a result, the device 403 sends a connection request to the wireless USB host 401.

Upon reception of the connection request from the wireless USB device 403, the wireless USB host 401 starts the transmission power control process shown in FIG. 13.

In step S1301, after allowing the wireless USB device 403 to connect, the host 401 issues a beacon interception request to the wireless USB device 403.

In step S1302, after a period of time specified by the beacon interception request elapses, the host 401 issues a beacon transfer request to the wireless USB device 403.

As a response to the beacon transfer request, the wireless USB device 403 transfers, to the wireless USB host 401, information on the beacons received by the device 403 itself. The wireless USB host 401 receives the information. The information on the beacons contains the contents of the beacons and information on timings when the beacons are received.

In step S1303, the host 401 analyzes the information on the beacon which has been received from the wireless USB device 403. The host 401 determines whether the wireless USB device 403 has received beacons from wireless terminals belonging to an asynchronous network (a wireless communication network 410 in this embodiment).

If the host 401 determines in step S1303 that the wireless USB device 403 has received beacons from wireless terminals belonging to the wireless communication network 410, the process advances to step S1304.

In step S1304, the host 401 sends, to the wireless USB device 403, a transmission power setting request for setting the transmission power to the minimum level at which the device 403 can communicate with the wireless USB host 401.

In step S1305, the host 401 sends, to the wireless USB device 403, a beacon transmission request to start beacon transmission during an asynchronous BP. Similarly to the above first embodiment, a beacon slot of an asynchronous BP used by the wireless communication network 410 is selected as a beacon transmission timing.

If a wireless USB device 412 belonging to the wireless communication network 410 can receive a beacon transmitted from the wireless USB device 403, the wireless USB device 412 stores the received beacon. More specifically, the address is stored in a field, of the fields of beacon slot occupancy information contained in a beacon to be transmitted by the device 412, which corresponds to the slot number at which the device 412 has received the beacon from the wireless USB device 403.

However, since the transmission power level of the wireless USB device 403 is relatively low at this time, the wireless USB device 412 cannot receive the beacon transmitted by the wireless USB device 403. Therefore, the beacon slot occupancy information contained in the beacon transmitted by the wireless USB device 412 does not contain information for identifying the wireless USB device 403.

In step S1306, the host 401 retransmits the beacon interception request and beacon transfer request to the wireless USB device 403 again. In response to the beacon interception request, the wireless USB device 403 receives the beacon transmitted from the wireless USB device 412. In response to the beacon transfer request, the device 403 transfers information on the received beacon to the wireless USB host 401.

In step S1307, the host 401 receives the information on the beacon transferred from the wireless USB device 403.

In step S1308, the host 401 analyzes the contents of the received beacon, and determines whether the beacon slot occupancy information contained in the beacon transmitted by the wireless USB device 412 contains information pertaining to the wireless USB device 403.

If the beacon slot occupancy information generated by the wireless USB device 412 does not contain information pertaining to the wireless USB device 403, the process advances to step S1309.

In step S1309, the host 401 determines that the beacon transmitted by the wireless USB device 403 does not reach the wireless USB device 412. The host 401 issues, to the wireless USB device 403, a transmission power setting request to raise the transmission power by one level. The process then returns to step S1305.

In step S1305, the host issues a beacon interception request to the wireless USB device 403 again. In this way, the transmission power of the wireless USB device 403 is gradually increased by repeating the processes in steps S1305 to S1309.

If the host 401 determines in step S1308 that the beacon slot occupancy information transmitted by the wireless USB device 412 contains information for identifying the wireless USB device 403, the process advances to step S1310.

In step S1310, the wireless USB host 401 determines that the beacon transmitted by the wireless USB device 403 has reached the wireless USB device 412. This means that the transmission power level can cause interference when the networks operate asynchronously.

In step S1310, the host 401 sends a transmission power setting request to instruct the wireless USB device 403 to lower (decrease) the transmission power by one level, and transits to a data communication process.

In subsequent data communication, the wireless USB device 403 transmits a wireless frame at the transmission power at this time. As a result, even the wireless frame transmitted asynchronously with respect to the wireless communication network 410 does not interfere with the wireless communication network 410.

As described above, the object of the present invention can be achieved by using not only a scheme in which the wireless USB device 403 gradually decreases the transmission power of itself but also a scheme in which the wireless USB device 403 gradually increases the transmission power of itself. The present invention also includes an embodiment in which these two schemes are combined.

As explained above, a communication apparatus serving as a control station receives information on a signal received by another communication apparatus, and executes the first determination to determine based on the information whether a signal transmitted by the other communication apparatus interferes with another network. On the basis of a result of the first determination, the communication apparatus executes the first instruction to instruct the other communication apparatus to control transmission power.

The first determination includes determining whether a communication apparatus of the other network receives the signal transmitted by the other communication apparatus.

The first instruction includes instructing the other communication apparatus to increase or decrease the transmission power until it is determined that the signal transmitted by the other communication apparatus does not interfere with the other communication network.

The second determination is executed to determine whether communication between the communication apparatus and the other communication apparatus is maintained. The first instruction includes instructing the transmission power to the other communication apparatus using, as a lower limit value, transmission power necessary for maintaining the communication between the communication apparatus and the other communication apparatus.

The communication apparatus executes the second instruction to instruct the other communication apparatus to transmit a signal synchronous to the other communication network.

The communication apparatus executes the third instruction to instruct the other communication apparatus to transmit information on the signal received by the other communication apparatus.

The communication apparatus executes the third determination to determine whether the other communication apparatus receives a signal from the other communication network. The second instruction includes instructing, based on the result of the third determination, to transmit a signal synchronous to the other communication network.

Other Embodiments

The present invention may be applied to a system including a plurality of devices (e.g., a host computer, interface device, reader, and printer) or an apparatus (e.g., a copying machine, or facsimile apparatus) formed by a single device.

The object of the present invention is also achieved when a recording medium which records software program codes for implementing the functions of the above-described embodiments is supplied to a system or apparatus. The above functions are implemented when the computer (or the CPU or MPU) of the system or apparatus reads out and executes the program codes stored in the recording medium. In this case, the recording medium which records the program codes constitutes the present invention.

The recording medium for supplying the program codes includes a floppy® disk, hard disk, optical disk, magnetooptical disk, CD-ROM, CD-R, magnetic tape, nonvolatile memory card, and ROM.

The present invention is not limited to a case in which the functions of the above-described embodiments are implemented when the computer executes the readout program codes. Also, the present invention includes a case in which the functions of the above-described embodiments are implemented when an OS (Operating System) or the like running on the computer performs some or all of actual processes on the basis of the instructions of the program codes.

Furthermore, the present invention includes a case in which, after the program codes read out from the recording medium are written in the memory of a function expansion board inserted into the computer or the memory of a function expansion unit connected to the computer, the functions of the above-described embodiments are implemented. That is, the present invention includes a case in which, after the program codes are written in the memory, the CPU of the function expansion board or function expansion unit performs some or all of actual processes on the basis of the instructions of the program codes and thereby implements the functions of the above-described embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-197848, filed on Jul. 30, 2007, which is hereby incorporated by reference herein in its entirety.

What is claimed is:

1. A communication system including a control station and a plurality of dependent stations, wherein said control station of a first network includes an instruction unit configured to instruct a dependent station to transmit a predetermined signal; a reception unit configured to receive a signal which is transferred by the dependent station, wherein the signal has been received by the dependent station from a second network; a determination unit configured to determine based on the signal received by said reception unit whether a device of the second network has received the predetermined signal which has been transmitted by the dependent station, and a controlling unit configured to control transmission power of a first dependent station when the determination unit determines that the device of the second network has received the predetermined signal which has been transmitted by the dependent station, and said first dependent station includes a first transmission unit configured to transmit the predetermined signal in accordance with instruction of said control station; a second transmission unit configured to transfer the signal to said control station, which is transmitted by the device of the second network after the first transmission unit transmits the predetermined signal; a control unit configured to control transmission power in accordance with instruction of said control station.

2. A first communication apparatus of a first network, comprising: a first instruction unit configured to instruct a second communication apparatus to transmit a predetermined signal; a reception unit configured to receive a signal which is transferred by the second communication apparatus, wherein the signal has been received by the second communication apparatus from a third communication apparatus of a second network; a first determination unit configured to determine, based on the signal received by said reception unit, whether a third communication apparatus of the second network has received the predetermined signal which has been transmitted by the second communication apparatus; and a second instruction unit configured to instruct to control transmission power of the second communication apparatus when the first determination unit determines that the third communication apparatus of the second network has received the predetermined signal which has been transmitted by the second communication apparatus.

3. The apparatus according to claim 2, wherein said second instruction unit instructs the second communication apparatus to increase or decrease the transmission power until said first determination unit determines that the third communication apparatus of the second network has received the predetermined signal which has been transmitted by the second communication apparatus.

4. The apparatus according to claim 2, further comprising:
a second determination unit configured to determine whether communication between said first communication apparatus and the second communication apparatus is maintained,
wherein said second instruction unit instructs the transmission power to the second communication apparatus using, as a lower limit value, transmission power necessary for maintaining the communication between said first communication apparatus and the second communication apparatus.

5. The apparatus according to claim 2, further comprising:
the first instruction unit configured to instruct the second communication apparatus to transmit a beacon signal synchronous with the second network.

6. The apparatus according to claim 5, further comprising:
a third determination unit configured to determine whether the second communication apparatus receives the signal from the second network,
wherein said first instruction unit instructs the second communication apparatus, based on the determination by said third determination unit, to transmit the beacon signal synchronous with the second network.

7. The apparatus according to claim 2, further comprising:
a third instruction unit configured to instruct the second communication apparatus to transmit the information on the signal received by the second communication apparatus.

8. A communication method for a first communication apparatus, comprising steps of instructing a second communication apparatus to transmit a predetermined signal; receiving a signal which is transferred by a second communication apparatus, wherein the signal has been received by the second communication apparatus from a third communication apparatus of a second network; determining based on the signal received in a receiving step whether the third communication apparatus of the second network has received the predetermined signal which has been transmitted by the second communication apparatus; and instructing to control transmission power of the second communication apparatus when it is determined in a determining step that the third communication apparatus of the second network has received the predetermined signal which has been transmitted by the second communication apparatus.

9. A non-transitory computer-readable storage medium storing a program which, when executed by a processor, will cause a computer to execute the communication method according to claim 8.

* * * * *